United States Patent
Chen et al.

(10) Patent No.: US 10,585,459 B2
(45) Date of Patent: Mar. 10, 2020

(54) HINGE ASSEMBLIES

(71) Applicant: HEWLETT-PACKARD DEVELOPMENT COMPANY, L.P., Spring, TX (US)

(72) Inventors: Wei-Chung Chen, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/348,626

(22) PCT Filed: Feb. 3, 2017

(86) PCT No.: PCT/US2017/016358
§ 371 (c)(1),
(2) Date: May 9, 2019

(87) PCT Pub. No.: WO2018/144001
PCT Pub. Date: Aug. 9, 2018

(65) Prior Publication Data
US 2019/0346889 A1    Nov. 14, 2019

(51) Int. Cl.
*G06F 1/16* (2006.01)
*H05K 5/02* (2006.01)
*F16C 11/04* (2006.01)

(52) U.S. Cl.
CPC ............ *G06F 1/1681* (2013.01); *F16C 11/04* (2013.01); *G06F 1/1616* (2013.01); *G06F 1/1652* (2013.01); *G06F 1/1656* (2013.01); *H05K 5/02* (2013.01)

(58) Field of Classification Search
CPC ............................ G06F 1/1652; G06F 1/1681
See application file for complete search history.

(56) References Cited

U.S. PATENT DOCUMENTS

| | | | |
|---|---|---|---|
| 6,377,324 B1 * | 4/2002 | Katsura | G02F 1/133305 349/58 |
| 6,577,496 B1 * | 6/2003 | Gioscia | G06F 1/1616 345/156 |
| 6,586,058 B1 | 7/2003 | Etzold | |

(Continued)

FOREIGN PATENT DOCUMENTS

CN    104932608 A    9/2015

OTHER PUBLICATIONS

Yoga Book, < http://shop.lenovo.com/us/en/tablets/lenovo/yoga-book/yoga-book-android/>.

*Primary Examiner* — Adrian S Wilson
(74) *Attorney, Agent, or Firm* — HP Inc. Patent Department

(57) ABSTRACT

Examples of hinge assemblies for a chassis of electronic devices and foldable devices are described. In one example, a hinge assembly comprises a set of rolling members aligned along a folding axis of a device implementing the hinge assembly. The set of rolling members is movable along a curvature of the device when the device is folded and retracted. The hinge assembly further comprises a resilient member to couple the set of rolling members to a sliding member provided within the chassis of the device. The sliding member is movable along a surface of the chassis, and the resilient member is to pull and retract the sliding member towards the folding axis based on the movement of the set of rolling members.

15 Claims, 8 Drawing Sheets

(56) References Cited

U.S. PATENT DOCUMENTS

| | | | |
|---|---|---|---|
| 8,514,558 B2 * | 8/2013 | Song | G06F 1/1624 |
| | | | 16/284 |
| 8,619,415 B1 | 12/2013 | Lam et al. | |
| 8,681,486 B2 | 3/2014 | Singhal | |
| 8,713,759 B2 | 5/2014 | Cai | |
| 8,804,324 B2 * | 8/2014 | Bohn | G06F 1/1616 |
| | | | 345/1.1 |
| 8,804,349 B2 * | 8/2014 | Lee | G06F 1/1641 |
| | | | 361/749 |
| 9,201,464 B2 | 12/2015 | Uchiyama et al. | |
| 9,213,374 B2 * | 12/2015 | Hung | G06F 1/1681 |
| 9,348,369 B2 * | 5/2016 | Kee | G06F 1/1616 |
| 9,727,092 B1 * | 8/2017 | Gerbus | G06F 1/1681 |
| 9,791,892 B2 * | 10/2017 | Park | G06F 1/1652 |
| 10,459,493 B2 * | 10/2019 | Lee | G06F 1/1679 |
| 2006/0146488 A1 * | 7/2006 | Kimmel | G06F 1/1616 |
| | | | 361/679.04 |
| 2007/0182663 A1 | 8/2007 | Biech | |
| 2010/0284143 A1 | 11/2010 | Lev et al. | |
| 2013/0021762 A1 * | 1/2013 | Van Dijk | G06F 1/1652 |
| | | | 361/749 |
| 2013/0335929 A1 | 12/2013 | Cavallaro | |
| 2014/0068473 A1 | 3/2014 | Jano et al. | |
| 2014/0184043 A1 | 7/2014 | Sprenger et al. | |
| 2014/0196254 A1 * | 7/2014 | Song | E05D 3/14 |
| | | | 16/302 |
| 2015/0241925 A1 * | 8/2015 | Seo | G06F 1/1652 |
| | | | 361/679.27 |
| 2015/0378397 A1 * | 12/2015 | Park | G06F 1/1652 |
| | | | 361/679.27 |
| 2018/0136700 A1 * | 5/2018 | Chen | E05D 3/06 |

\* cited by examiner

HINGE ASSEMBLIES

BACKGROUND

Electronic devices, such as portable devices, are generally manufactured to be compact and light in weight to provide ease of handling and portability to users. To enhance the compactness and, in turn, the portability of the electronic devices, the electronic devices have support structures, such as hinges that allow a component of the electronic device, such as a display unit, to fold over another component of the electronic device, such as a keypad unit.

In some cases, electronic devices, such as a pedometer wearable on a wrist may be foldable. Foldable electronic devices generally comprise a flexible casing that may be made of an elastic polymer material. The flexible casing houses components such as a display unit and a touch pad that may also be flexible.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
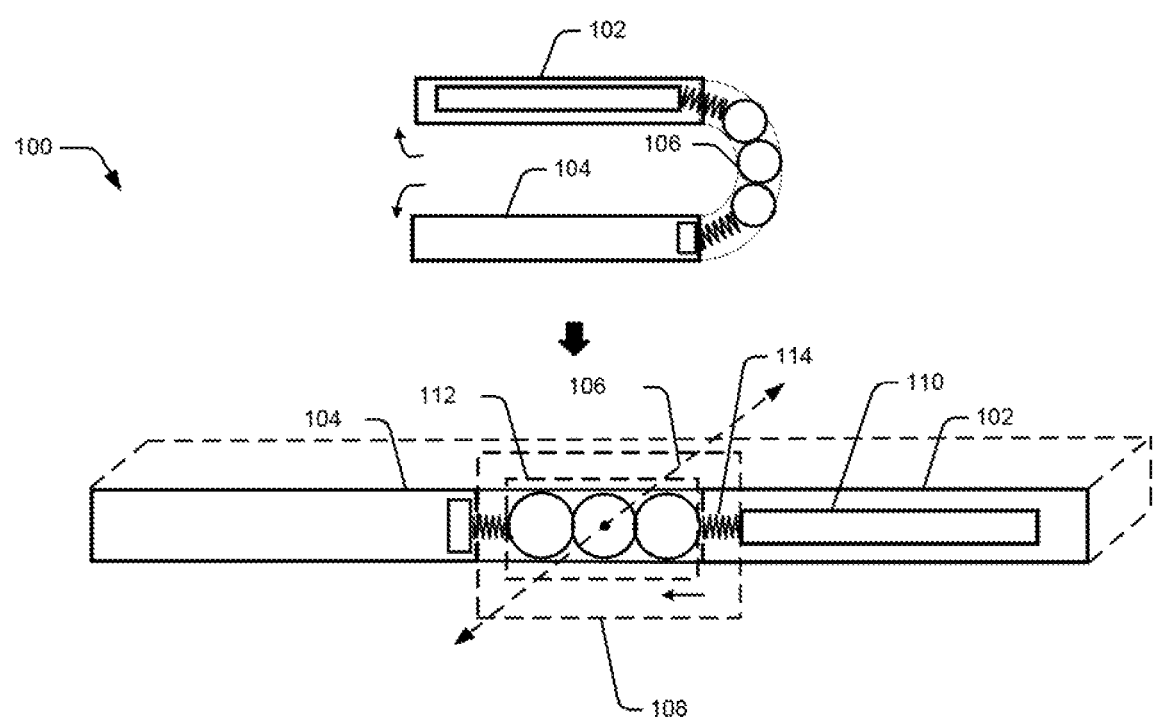
FIG. 1 illustrates a schematic representation of a chassis for an electronic device, in accordance with an example implementation of the present subject matter.

Generally, electronic devices, such as foldable devices have flexible components, for instance flexible display screens to display content to users. The flexible display screens have a folding edge and are foldable and retractable about the folding edge. During operation, when a foldable device is folded, a portion of the flexible display screen around the folding edge is compressed to adapt to the folded position, and when retracting the device from the folded position to an open position, the portion of the flexible display screen around the folding edge is stretched to adapt to the retracted position.

Such compressing and stretching of the flexible display screen, over a period of time, causes a strain on the portion of the flexible display screen around the folding edge and may damage the flexible display screen of the foldable device. Generally available supporting structures fail to provide adequate support to the flexible display screens. Also, the supporting structures are complicated to implement, are expensive, and result in increasing the cost of the foldable device.

In accordance with an implementation of the present subject matter, a foldable device having a hinge assembly coupled to a flexible display screen of the foldable device is described. In one example, the foldable device has a flexible chassis to accommodate the flexible display screen. The flexible display screen has a folding edge along a width of the flexible display screen, and is foldable and retractable about the folding edge.

The hinge assembly comprises a set of rolling members and a resilient member to support folding and retracting of the flexible display screen. In one example, the set of rolling members is aligned along the folding edge of the flexible display screen. In the set of rolling members, each rolling member is coupled to an adjacent rolling member to allow movement of the set of rolling members along a curvature of the flexible display screen when the foldable device is folded.

In an example implementation of the present subject matter, the resilient member couples the set of rolling members to a sliding member provided within the chassis. The sliding member is movable along a surface of the chassis. The sliding member, the resilient member, and the set of rolling members are aligned such that the resilient member can pull the sliding member along the chassis based on movement of the set of rolling members about the curvature.

In a folded position, a portion of the flexible display screen at the curvature is compressed, and in an open and retracted position, the portion of the screen is stretched. During retracting the foldable device from the folded position, the set of rolling members move about the folding edge to adapt to a retracted position, and the resilient member pulls the sliding member towards the folding edge of the flexible display screen along surface of the flexible chassis. The pulling of the sliding member by the resilient member compensates for the stretching of the portion of the flexible display screen during retracting and the portion of the flexible display screen is provided enhanced support.

Thus, the hinge assembly for electronic device as described herein supports the display screen thereby increasing life of the flexible display screen. Further, the hinge assembly is cost efficient and does not add to the cost of the device.

In some examples, electronic devices that do not comprise a flexible chassis but are foldable about a folding axis may also implement the hinge assembly described herein. In such example implementations, a chassis accommodating a display unit and an input unit of an electronic device may include a sliding member connected to the resilient member of the hinge assembly. As the display unit is folded over the input unit, the set of rolling members of the hinge assembly align along the folding axis of the electronic device and as the display unit is retracted to the open position, the sliding member slides along a surface of the chassis. The hinge assembly provides for a seamless folding and retracting arrangement implementable in a cost effective manner.

The above described techniques are further described with reference to FIGS. 1 to 8. It should be noted that the description and figures merely illustrate the principles of the present subject matter along with examples described herein and, should not be construed as a limitation to the present subject matter. It is thus noted that various arrangements may be devised that, although not explicitly described or shown herein, describe the principles of the present subject matter. Moreover, all statements herein reciting principles, aspects, and examples of the present subject matter, as well as specific examples thereof, are intended to encompass equivalents thereof.

FIG. 1 schematically illustrates a chassis 100 for an electronic device according to an example implementation of the present subject matter. In an example, the electronic device may be a foldable device such as a pedometer wearable by a user on wrist or waist, a heart rate monitor wearable on a part of the body, such as wrist or forearm and so on. Other examples of the electronic device may be a foldable portable device, such as a smartwatch, foldable tablet, Personal Digital Assistant (PDA), a notebook, e-reader, or another foldable portable device.

The chassis 100 comprises two parts, a first part 102 and a second part 104 to accommodate a first component and a second component of the electronic device, respectively. In one example, the first component is a display unit of the electronic device and the second component is an input unit, such as a touch pad of the electronic device. In one example, the first part 102 and the second part 104 are aligned such that the first part 102 is foldable and retractable over the second part 104 about an axis, referred to as a folding axis 106 hereinafter. The first part 102 and the second part 104 are on opposite sides of the folding axis 106.

The chassis 100 comprises a hinge assembly 108. The hinge assembly 108 comprises a sliding member 110. In one example implementation, the sliding member 110 is provided either within the first part 102 or within the second part 104 of the chassis 100 and can slide along a surface of the first part 102 or the second part 104. A set of rolling members 112 is aligned along the folding axis 106 of the chassis 100, such that during folding or retracting of the chassis 100, the set of rolling members 112 move along a curvature of the chassis to support the folding and retracting of the chassis 100.

A resilient member 114 couples the set of rolling members 112 with the sliding member 110. The resilient member 114 stretches and recoils to pull and retract the sliding member 110 towards the folding axis 106 when the first part 102 is folded and retracted over the second part 104. The pulling of the sliding member 110 towards the folding axis 106 upon retracting of the chassis 100 provides support to components accommodated in the chassis 100.

Figure 2:
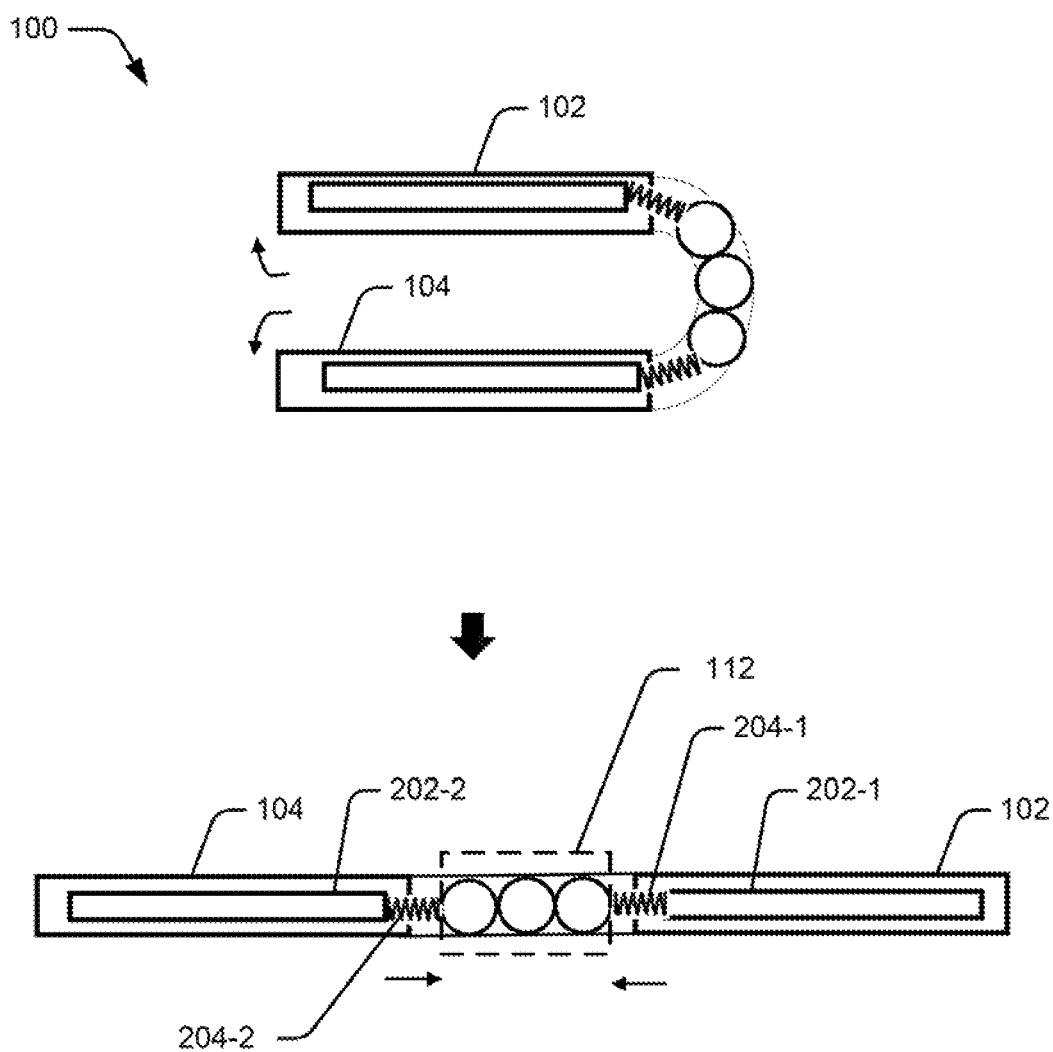
FIG. 2 illustrates a schematic representation of a chassis for an electronic device, in accordance with an example implementation of the present subject matter.

FIG. 2 is a schematic representation of the chassis 100 according to another example implementation of the present subject matter. In one example, the chassis 100 is composed of a flexible material, such as an elastic polymer to provide flexibility to the chassis 100.

In some example implementations, such as the one depicted in FIG. 2, the first part 102 and the second part 104 of the chassis 100 each include a sliding member. As shown in FIG. 2, the first part 102 has a first sliding member 202-1 and the second part 104 has a second sliding member 202-2, and the sliding members 202-1 and 202-2 can slide along surfaces of the first part 102 and the second part 104, respectively.

The set of rolling members 112 may include two or more rolling members, such as rotary gears or rollers to move about the folding axis 106 during folding and retracting of the first part 102. Each rolling member is coupled to an adjacent rolling member such that during movement of the set of rolling members 112, each rolling member moves along a circumference of the adjacent rolling member.

A first resilient member 204-1, present in the first part 102 of the chassis 100, and a second resilient member 204-2 in the second part 104, couple the set of rolling members 112 to the first and the second sliding members 202-1 and 202-2 respectively. The first resilient member 204-1 and the second resilient member 204-2 can be, for instance, rubber elements or sets of helical springs.

When the chassis 100 is in the folded position with the first part 102 folded over the second part 104, the chassis 100 has a curvature around the folding axis 106, and the set of rolling members 112 is aligned along the curvature of the chassis 100. When the first part 102 of the chassis 100 is retracted from the folded position, the set of rolling members 112 moves about the curvature of the chassis 100 around the folding axis 106 to allow retracting of the first part 102. As the first part 102 is retracted, the resilient members 204-1 and 204-2 pull the sliding members 202-1 and 202-2 to move in a direction towards the folding axis 106 of the chassis 100. As the sliding members 202-1 and 202-2 move towards the folding axis 106 during retracting, the first part 102 and the second part 104 move towards the folding axis 106. The movement of the first part 102 and the second part 104 reduces strain or tension on the chassis 100 around the folding axis 106 due to stretching of the chassis 100 during retracting.

In examples including the single sliding member 110, the sliding member 110 is movable along the surface of the first part 102 or the second part 104, whichever part has the sliding member 110, by the stretch and recoil action of the corresponding resilient member 114 caused by the movement of the set of rolling members 112. The set of rolling members 112 on the other part, i.e., one of the first part 102 and the second part 104 not accommodating the sliding member 110, may be coupled to a stationary member provided within such other part of the chassis 100. In an example, a resilient member, such as resilient member 114 may be incorporated in the other part of the chassis 100 so as to stretch and recoil based on the movement of the set of rolling members 112 in the other part.

Figure 3:
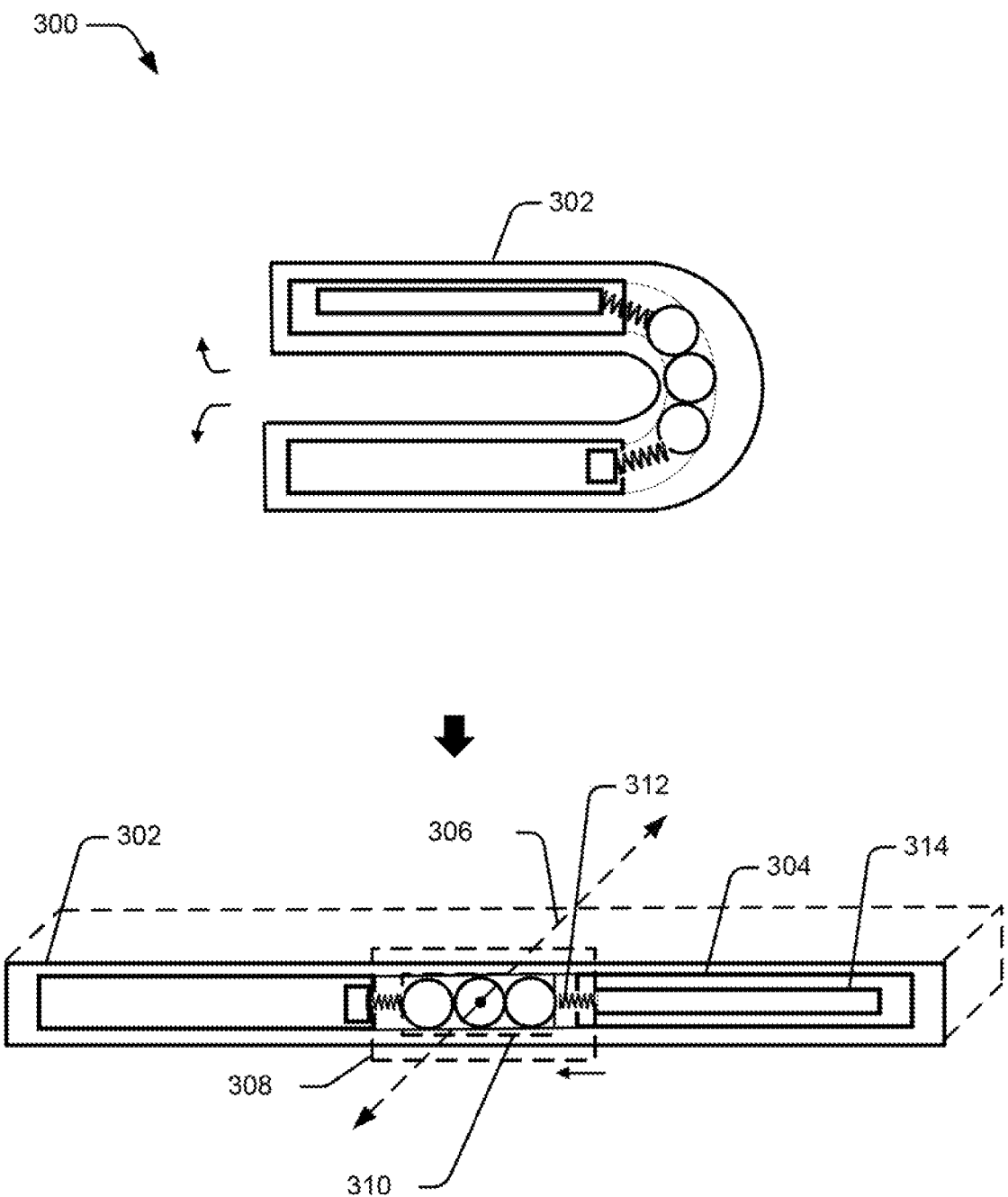
FIG. 3 is a schematic representation of a foldable device, in accordance with an example implementation of the present subject matter.

FIG. 3 illustrates a schematic representation of a foldable device 300 in accordance with an example implementation of the present subject matter. In an example, the foldable device 300 may be a wearable device, such as a fitness tracking band, a smartwatch or the pedometer enabled device. In other examples, the foldable device 300 may be a foldable tablet, laptop, or a notebook. The foldable device 300 comprises a flexible chassis 302 and a flexible display screen 304. In one example, the flexible chassis 302 is composed of a flexible material, such as an elastic polymer, and the flexible display screen 304 is an Organic Light Emitting Diode (OLED) screen. The flexible display screen 304 is housed within the flexible chassis 302 and has a folding edge 306. The flexible display screen 304 is foldable and retractable about the folding edge 306. The flexible chassis 302 supports the flexible display screen 304 during folding and retracting about the folding edge 306.

A hinge assembly 308 is coupled to the flexible display screen 304 around the folding edge 306 and is housed within the flexible chassis 302. The hinge assembly 308 is aligned with the flexible display screen 304 such that the hinge assembly 308 supports the flexible display screen 304 during folding and retracting about the folding edge 306. In an example implementation, the hinge assembly 308 comprises a set of rolling members 310. The set of rolling members 310 is aligned along the folding edge 306 of the flexible display screen 304 such that the set of rolling members 310 moves about the curvature of the flexible display screen 304 during folding and retracting of the flexible display screen 304.

A resilient member 312 couples the set of rolling members 310 with a sliding member 314 provided within the flexible chassis 302 such that the resilient member 312 pulls and retracts the sliding member 314 towards the folding edge based on the movement of the set of rolling members 310.

Figure 4:
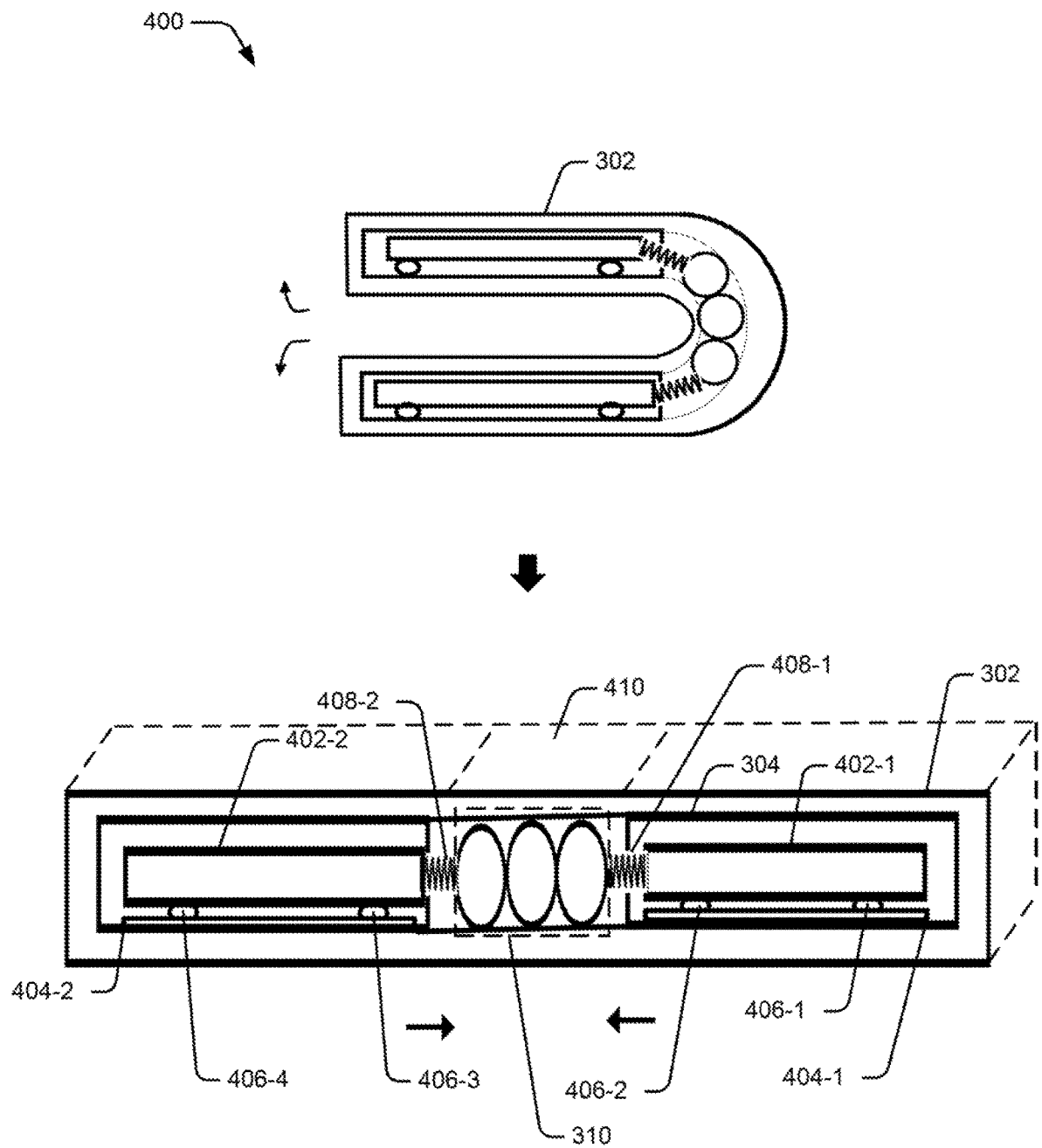
FIG. 4 is a schematic representation of a foldable device, in accordance with an example implementation of the present subject matter.

FIG. 4 illustrates a schematic representation of the foldable device 400 in accordance with another example implementation of the present subject matter. In the example implementation illustrated in FIG. 4, the flexible chassis 302 has a first sliding member 402-1 and a second sliding member 402-2 disposed on either side of the set of rolling members 310, such that the sliding members 402-1 and 402-2 can slide along a surface or surfaces of the flexible chassis 302. Example foldable devices 300 that include one sliding member coupled to the set of rolling members 310 on one end, may comprise resilient members 312 that tether the other end of the set of rolling members 310 to a wall of the flexible chassis 302.

In some examples, the flexible chassis 302 of the foldable device 400 includes rail members 404-1 and 404-2 provided on either side of the set of rolling members 310. As shown in FIG. 4, the rail members 404-1 and 404-2 are positioned below the sliding members 402-1 and 402-2 along the path of movement of the sliding members 402-1 and 402-2 within the flexible chassis 302. In an example, the rail members 404-1 and 404-2 have grooves (not shown in FIG. 4). Each of the sliding members 402-1 and 402-2 may include projections 406-1, 406-2, 406-3, and 406-4 that are aligned to the grooves such that the projections 406-1, 406-2, 406-3, and 406-4 are accommodated in the grooves of the rail members 404-1 and 404-2 to allow low friction and smooth sliding of the sliding members 402-1 and 402-2 along the grooves.

In examples comprising a single sliding member in the first part 102 or the second part 104 of the flexible chassis 302 of the foldable device 300 (as illustrated in FIG. 3), it will be noted that the rail members 404-1 and 404-2 may be installed accordingly. Thus, in some examples, the rail member 404-1 or the rail member 404-2 may be provided within the part of the chassis 100 accommodating the sliding member 402-1 or 402-2 and not within the other part of the flexible chassis 302.

In an example, the foldable device 400 is foldable from a position of about an angle of 0 degrees (°) between the first part 102 and the second part 104 to a position of about an angle of 360° between them about the folding edge 306. It would be noted that in the folded position, such as a position corresponding to the angle of about 0° between the first part 102 and the second part 104, and a position corresponding to the angle of about 360° between the first part 102 and the second part 104, a portion of the screen 410 around the folding edge 306 is compressed around the folding edge 306 to adapt to the folded position. In these positions, the set of rolling members 310 moves about the curvature of the flexible chassis around the folding edge 306.

Upon retracting the foldable device 300 from the folded position to an open position, for instance, where the first part 102 is at about 180° with respect to the second part 104, the movement of the set of rolling members 310 allows recoiling of resilient members 408-1 and 408-2 on both sides of the set of rolling members 310 to pull the corresponding sliding members 402-1 and 402-2 towards the folding edge 306. The sliding members 402-1 and 402-2 then slide along the grooves of the corresponding rail members 404-1 and 404-2 to move towards the folding edge 306.

The pulling of the sliding members 402-1 and 402-2 provides adequate support to the flexible display screen 304 during retracting thereby preventing any strain or tension on the portion of the screen 410. This enhances life of the flexible display screen 304.

Figure 5:
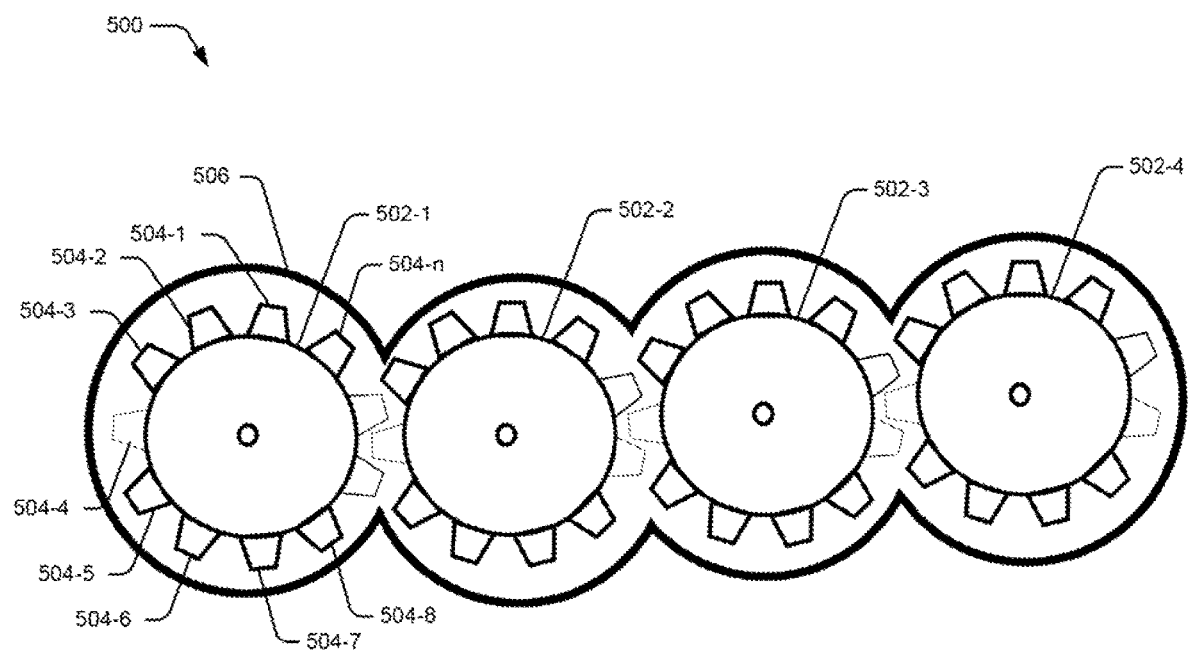
FIG. 5 illustrates a schematic representation of a set of rolling members of a hinge assembly, in accordance with an example implementation of the present subject matter.

FIG. 5 is a schematic representation of the set of rolling members 500 in accordance with an example implementation of the present subject matter. The set of rolling members 500 comprises multiple rolling members, such as a rolling member 502-1, 502-2, 502-3, and 502-4. For ease of reference, the rolling members 502-1, 502-2, 502-3, and 502-4 are commonly referred to as a rolling member 502.

It would be noted that although the figure illustrates the set of rolling members 500 having four rolling members, the set of rolling members 500 may also be implemented with more or less than four rolling members.

The rolling member 502, in one example, may be a rotary gear having multiple teeth or wedges 504-1, 504-2, ... 504-n arranged on surface of the rolling member 502. In another example, the rolling member 502 has multiple sprockets on the surface. For sake of reference, the multiple teeth or wedges 504-1, 504-2, ... 504-n have been commonly referred to as multiple teeth 504-n.

In operation, the multiple teeth 504-n of one rolling member 502 meshes with multiple teeth 504-n of an adjacent rolling member 502 in a gear like manner. The set of rolling members 500 is supported by a drive chain 506 that engages with the multiple teeth 504-n of rolling members 502. The drive chain 506 and rolling members 502 are aligned such that the rolling member 502 may move along circumference of the adjacent rolling member during movement of the set of rolling members 500 to allow folding and retracting of a device in which the set of rolling members 500 is implemented.

In another example, the rolling member 502 may be a roller, for instance a friction type roller or a normal force type roller. Each rolling member 502 may roll over circumference of the adjacent rolling member 502 to allow the movement of the set of rolling members 500. The set of rolling members 500 may be surrounded by a drive belt, such as a conveyor belt to engage each rolling member 502 and support rolling of each rolling member 502 along circumference of adjacent rolling member 502.

The set of rolling members 500 may be implemented in various electronic devices that have foldable components, foldable and retractable along a folding axis. For instance, the set of rolling members 500 may be implemented within electronic devices that are not flexible but are foldable about a hinge assembly, such as hinge assembly 308 located along a folding axis of the respective electronic devices. In such electronic devices, the chassis may have a first part and a second part that are foldable and retractable along a folding axis. The set of rolling members 500 may be aligned along the folding axis. During folding or retracting of the first part or the second part of the chassis, the set of rolling members 500 support folding and retracting of the first part or the second part.

In another example, the set of rolling members 500 may be implemented in a flexible chassis of a foldable device, such as the flexible chassis 302 of the foldable device 300. The flexible chassis 302 accommodates flexible components, such as flexible display screens having folding edges. When a foldable device is folded or retracted, the set of rolling members 500 move about a curvature of a foldable device such that any strain or tension during stretching of the flexible display screen or during compression of the flexible display screen is prevented.

Figure 6:
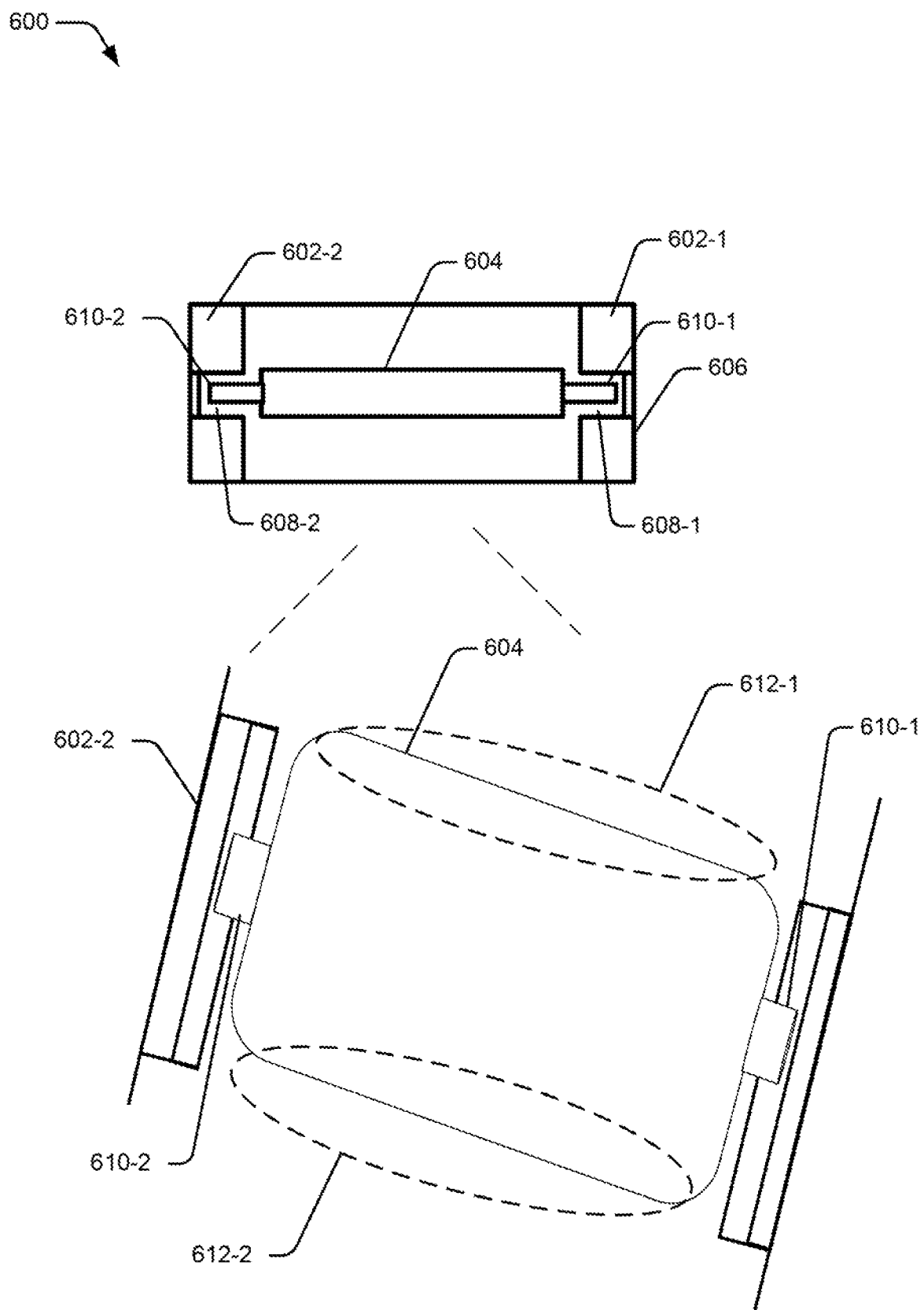
FIG. 6 is a schematic representation of an arrangement of a rail member and a sliding member within a chassis of an electronic device, according to an example implementation of the present subject matter.

FIG. 6 illustrates a schematic representation of an arrangement of rail members 602-1 and 602-2 and a sliding member 604 within a chassis 606 of a foldable electronic device 600, in accordance with an example implementation of the present subject matter.

In various examples, the rail members 602-1 and 602-2 may be provided at different locations within the chassis 606. For instance, the rail members 602-1 and 602-2 may be provided along the side walls of the chassis 606 in an example as shown in the FIG. 6. In another example, the rail members 602-1 and 602-2 may be provided below the sliding member 604 along a lower surface of the chassis 606. In either case, the location of the rail members corresponds with the direction of movement of the sliding members.

Referring to the example implementation depicted in FIG. 6, the rail members 602-1 and 602-2 have a groove 608-1, and a groove 608-2, respectively. The sliding member 604 has projections, 610-1 and 610-2 on either side of the sliding member 604. As shown in FIG. 6, the projections 610-1 and 610-2 are respectively accommodated within the grooves 608-1 and 608-2 of the rail members 602-1 and 602-2 such that the sliding member 604 may slide along the grooves 608-1 and 608-2 of the rail members 602-1 and 602-2. The projections 610-1 and 610-2 may have different shapes based on the shape of grooves provided within the rail members 602-1 and 602-2.

As mentioned above, based on the position of the rail members 602-1 and 602-2 within the chassis 606, the sliding members may have the multiple projections, such as projections 610-1 and 610-2. For instance, for the rail members 602-1 and 602-2 positioned on the side of the chassis 606, the multiple projections 610-1 and 610-2 are provided on the sides of the sliding member 604. In an example, a projection of a sliding member, for example, located at bottom center of the sliding member may move along a corresponding rail located at the center of the lower surface of the chassis. The projections, such as projections 610-1 and 610-2 have a reduced overall surface contact with the grooves of the rail members 602-1 and 602-2 thereby providing a low friction and smooth sliding of the sliding member 604 along the rail members 602-1 and 602-2.

In one example implementation, the sliding member 604 is coupled to a resilient member (not shown in the figure), such as the resilient member 114, or 312, of the electronic device. In one example, the resilient member may be coupled on a side 612-1 or on another side 612-2 of the sliding member 604. The sliding member 604 is coupled to the resilient member, such that when the electronic device is retracted from a folded position, the resilient member pulls the sliding member 604 towards the resilient member, and the projections 610-1 and 610-2 allow the sliding members to slide along the grooves 608-1 and 608-2 of the rail members 602-1 and 602-2 towards the resilient member.

The arrangement of rail members 602-1 and 602-2 and the sliding member 604, as depicted in FIG. 6 may be implemented in a chassis of an electronic device having foldable components. The rail members 602-1 and 602-2 may be provided on one side or both sides of a set of rolling members 310 of the electronic device and may allow sliding of a sliding member along the rail members 602-1 and 602-2. In another example, the arrangement of rail members 602-1 and 602-2 and the sliding member 604 may be provided within a flexible chassis, such as the flexible chassis 302 of the foldable device 300 to allow sliding of a sliding member provided within the flexible chassis when the foldable device is folded or retracted.

Figure 7:
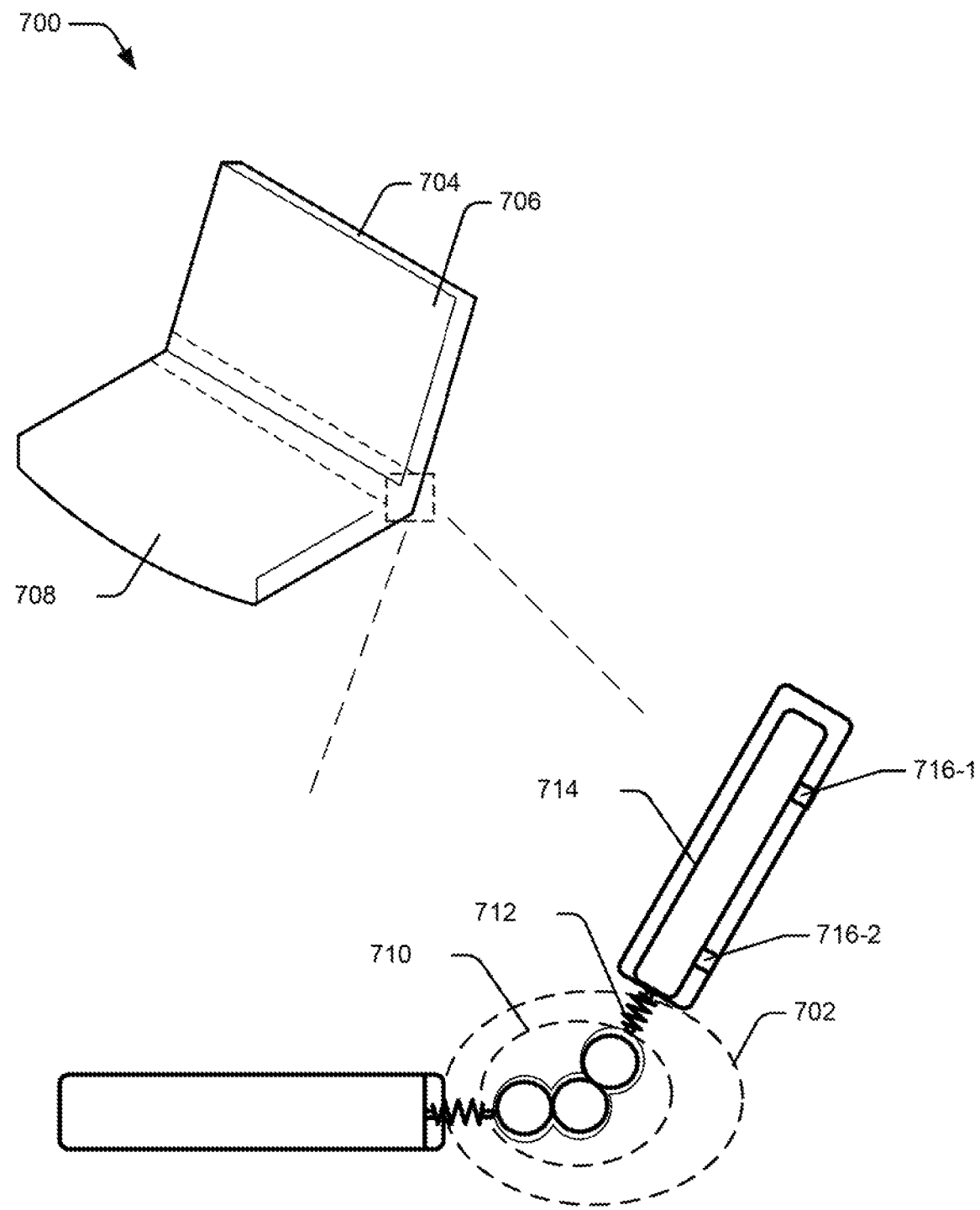
FIG. 7 illustrates an electronic device implementing a hinge assembly, according to an example implementation of the present subject matter.

FIG. 7 illustrates a schematic representation of an electronic device 700 implementing a hinge assembly 702 according to an example implementation of the present subject matter. Examples of the electronic devices 700 may include, a laptop, a PDA, an e-reader, and a tablet. In one example, the electronic device 700 comprises a chassis 704 to accommodate a display unit 706 and an input unit 708 of the electronic device 700.

The display unit 706 is coupled to the input unit 708 through the hinge assembly 702 such that the hinge assembly 702 allows folding and retracting of the display unit 706 about a folding axis of the electronic device 700. The hinge assembly 702 comprises a set of rolling members 710 aligned along the folding axis of the electronic device 700 to move along a curvature of the electronic device 700 when the display unit 706 is folded and retracted.

A resilient member 712 is provided on a side of the set of rolling members 710 to couple the set of rolling members 710 with a sliding member 714 provided within the chassis 704. In one example, the sliding member 714 has projections 716-1 and 716-2 to allow movement of the sliding member 714 along surface of the chassis 704. As the display unit 706 is retracted from a folded position, the resilient member 712 pulls and retracts the sliding member 714 towards the folding axis based on the movement of the set of rolling members 710.

Figure 8:
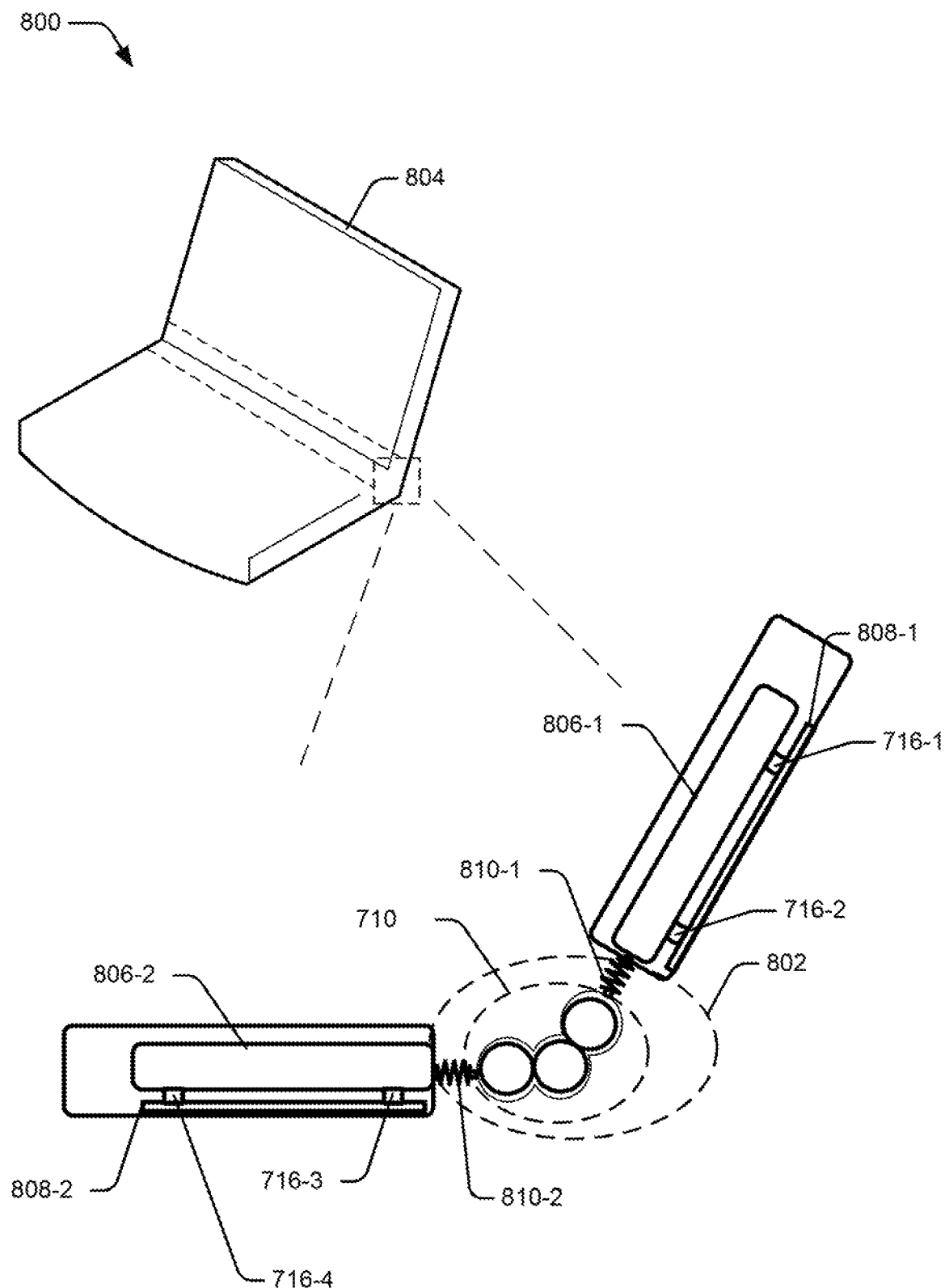
FIG. 8 illustrates an electronic device implementing a hinge assembly, according to an example implementation of the present subject matter.

FIG. 8 illustrates a schematic representation of the electronic device 800 implementing a hinge assembly 802 in accordance with another example implementation of the present subject matter. In one example, a chassis 804 of the electronic device has a first sliding member 806-1 on one side of the set of rolling members 710 and a second sliding member 806-2 positioned on another side of the set of rolling members 710.

Some examples of the electronic device 800 include one sliding member 714 positioned on one side of the set of rolling members 710 and coupled to the set of rolling members 710 through the resilient member 712. The sliding member 714 may move along a surface of the chassis 804 when the electronic device 800 is folded or retracted. On the other side of the set of rolling members 710, another resilient member may couple the set of rolling members 710 to a stationary part of the chassis 804 such that the other resilient member stretches and recoils when the electronic device 800 is folded or retracted to allow folding and retracting of the electronic device 800.

In one example implementation, the chassis 804 may include rail members 808-1 and 808-2 along the surface of the chassis 804 on either sides of the set of rolling members 710. The rail members 808-1 and 808-2 have grooves to accommodate the multiple projections 716-1, 716-2, 716-3, and 716-4 of the sliding members 806-1 and 806-2 and allow sliding of the sliding members 806-1 and 806-2 along the rail members 808-1 and 808-2 of the chassis 804.

In example electronic devices 800 having single sliding member 714, the rail member 808-1 or 808-2 may be provided within part of the chassis 804 having the sliding member 714 and no rail member nay be provided within the other part of the chassis 804 having the stationary part.

In operation, when the electronic device 800 is retracted from the folded position, the set of rolling members 710 align substantially parallel to the folding axis of the electronic device 800 to support the retracting. During aligning of the set of rolling members 710, the resilient members 810-1 and 810-2 recoil and pull the corresponding sliding members 806-1 and 806-2 towards the folding axis of the electronic device 800 thereby enabling smooth folding and retracting operation of the device.

Therefore, the hinge assemblies as described herein provide adequate support to foldable devices or electronic devices having foldable components and enhance life of such electronic devices. Further, the hinge assemblies are cost efficient and do not add to the cost of a device.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

What is claimed is:

1. A foldable device comprising:
   a flexible chassis;
   a flexible display screen housed in the flexible chassis, the flexible display screen having a folding edge and being foldable and retractable about the folding edge; and
   a hinge assembly coupled to the flexible display screen to support the flexible display screen during folding and retracting, the hinge assembly comprising:
      a set of rolling members aligned along the folding edge of the flexible display screen, such that the set of rolling members moves about a curvature of the flexible display screen upon folding and retracting of the flexible display screen; and
      a resilient member to couple the set of rolling members to a sliding member provided in the flexible chassis, the resilient member to pull and retract the sliding member towards the folding edge based on the movement of the set of rolling members.

2. The foldable device as claimed in claim 1, wherein the set of rolling members comprises one of rotary gears and rollers.

3. The foldable device as claimed in claim 1, wherein the flexible chassis comprises a rail member with a groove to allow sliding of the sliding member along the groove of the rail member during folding and retracting of the flexible display screen.

4. The foldable device as claimed in claim 1 further comprising one of a drive belt and a drive chain to engage with the set of rolling members along an outer circumference to support the set of rolling members.

5. The foldable device as claimed in claim 1, wherein the resilient member comprises one of a set of helical springs and a rubber piece.

6. The foldable device as claimed in claim 1, wherein each rolling member of the set of rolling members comprises multiple teeth on a surface, wherein the multiple teeth of each rolling member provide for adjacent rolling members in the set of rolling members to engage in a gear-like manner.

7. A chassis for an electronic device, comprising:
   a first part to accommodate a first component of the electronic device;
   a second part to accommodate a second component of the electronic device, wherein the first part is foldable over the second part about a folding axis of the chassis;
   a hinge assembly comprising:
      a sliding member provided in at least one of the first part and the second part, the sliding member to slide within the at least one of the first part and the second part along a surface of the at least one of the first part and the second part;
      a set of rolling members aligned along the folding axis of the chassis, to move along a curvature of the chassis upon folding and retracting of the first part; and
      a resilient member to couple the set of rolling members to the sliding member, the resilient member to pull and retract the sliding member towards the folding axis based on folding and retracting of the first part.

8. The chassis as claimed in claim 7, wherein the first component is a display unit having a flexible display screen, the second component is an input unit comprising one of a keypad and a touchpad to allow a user to provide an input to the electronic device and wherein the chassis is comprised of a flexible material.

9. The chassis as claimed in claim 7, wherein the at least one of the first part and the second part accommodating the sliding member has a rail member with a groove, such that the sliding member slides along the groove of the rail member during the folding and retracting of the first part.

10. The chassis as claimed in claim 7, wherein the set of rolling members comprise one of friction type rollers and normal force type rollers.

11. An electronic device comprising:
    a chassis to accommodate a display unit and an input unit; and
    a hinge assembly to couple the display unit to the input unit to allow folding and retracting of the display unit about a folding axis of the electronic device, the hinge assembly comprising:
       a set of rolling members aligned along the folding axis of the electronic device to move along a curvature of the electronic device upon the display unit being folded and retracted; and
       a resilient member to couple the set of rolling members to a sliding member provided within the chassis, the sliding member to move within the chassis along a surface of the chassis, and the resilient member to pull and retract the sliding member towards the folding axis based on the movement of the set of rolling members.

12. The electronic device as claimed in claim 11, wherein the chassis houses a rail member having a groove to allow the sliding member to slide along the groove of the rail member during folding and retracting of the display unit.

13. The electronic device as claimed in claim 11, wherein each rolling member of the set of rolling members comprises multiple teeth on a surface, wherein the multiple teeth of each rolling member provide for adjacent rolling members in the set of rolling members to engage in a gear-like manner.

14. The electronic device as claimed in claim 11, wherein the set of rolling members comprises one of a drive belt and a drive chain to engage the set of rolling members along an outer circumference to support the set of rolling members.

15. The electronic device as claimed in claim 11, wherein the chassis has a sliding member on either side of the set of rolling members, and a resilient member coupling each sliding member to the set of rolling members, such that each resilient member pulls and retracts the corresponding sliding member towards the folding axis based on the movement of the set of rolling members.

* * * * *